United States Patent
Gordon

(10) Patent No.: US 11,945,388 B2
(45) Date of Patent: Apr. 2, 2024

(54) ROLL CAGE CHASSIS SPINE

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 166 days.

(21) Appl. No.: 17/104,881

(22) Filed: Nov. 25, 2020

(65) Prior Publication Data

US 2021/0155189 A1 May 27, 2021

Related U.S. Application Data

(60) Provisional application No. 62/940,842, filed on Nov. 26, 2019.

(51) Int. Cl.
*B60R 21/13* (2006.01)
*B60R 21/00* (2006.01)

(52) U.S. Cl.
CPC ...... *B60R 21/13* (2013.01); *B60R 2021/0018* (2013.01)

(58) Field of Classification Search
CPC .................. B60R 21/13; B60R 2021/0018
See application file for complete search history.

(56) References Cited

U.S. PATENT DOCUMENTS

| | | | |
|---|---|---|---|
| 10,843,743 B2 * | 11/2020 | St-Pierre | B62D 23/005 |
| 10,967,825 B2 * | 4/2021 | Hisamura | B62D 27/065 |
| 11,028,883 B2 * | 6/2021 | Olason | B60K 17/35 |
| 11,104,194 B2 * | 8/2021 | Schlangen | B62D 1/163 |
| 11,345,406 B2 * | 5/2022 | Johnson | B62D 21/183 |
| 2011/0298189 A1 * | 12/2011 | Schneider | B62D 23/005 296/64 |
| 2013/0256050 A1 * | 10/2013 | Novotny | B62D 23/005 180/312 |
| 2014/0353956 A1 * | 12/2014 | Bjerketvedt | B60N 2/24 296/64 |
| 2018/0065465 A1 * | 3/2018 | Ward | B62D 5/04 |
| 2018/0147966 A1 * | 5/2018 | Reed | B60J 5/0487 |
| 2020/0346542 A1 * | 11/2020 | Rasa | B62D 23/005 |
| 2020/0361273 A1 * | 11/2020 | Borud | B60K 11/02 |
| 2021/0129921 A1 * | 5/2021 | Rasa | B60R 21/13 |
| 2021/0155190 A1 * | 5/2021 | Gordon | B60R 21/13 |
| 2021/0155191 A1 * | 5/2021 | Gordon | B62D 23/00 |

* cited by examiner

*Primary Examiner* — Toan C To
(74) *Attorney, Agent, or Firm* — Barry Choobin; Patent 360

(57) ABSTRACT

An apparatus and methods are provided for a chassis for an off-road vehicle that includes a roll cage chassis spine. The chassis is a welded-tube variety of chassis that includes a front portion and a rear portion that are joined to an intervening passenger cabin portion. The roll cage chassis spine includes a front canopy and a rear canopy comprising an overhead spine to the chassis that increases the strength of the chassis and improves the safety of occupants within the vehicle. The rear canopy couples to the rear portion of the chassis, and the front canopy couples to the front portion of the chassis and the rear canopy. The front canopy and the rear canopy are configured to cooperatively reinforce the chassis during loading forces on the front portion due to front struts and loading forces on the rear portion due to rear struts.

18 Claims, 4 Drawing Sheets

ROLL CAGE CHASSIS SPINE

PRIORITY

This application claims the benefit of and priority to U.S. Provisional Application, entitled "Roll Cage Chassis Spine," filed on Nov. 26, 2019 and having application Ser. No. 62/940,842, the entirety of said application being incorporated herein by reference.

FIELD

Embodiments of the present disclosure generally relate to the field of vehicle chassis systems. More specifically, embodiments of the disclosure relate to an apparatus and methods for an off-road vehicle chassis comprising a roll cage spine configured to improve the strength of the chassis.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a chassis for an off-road vehicle that includes a roll cage chassis spine. The chassis is a welded-tube variety of chassis that includes a front portion and a rear portion that are joined to an intervening passenger cabin portion. The roll cage chassis spine includes a front canopy and a rear canopy comprising an overhead spine to the chassis that increases the strength of the chassis and improves the safety of occupants within the vehicle. The rear canopy couples to the rear portion of the chassis, and the front canopy couples to the front portion of the chassis and the rear canopy. The front canopy and the rear canopy are configured to cooperatively reinforce the chassis during loading forces on the front portion due to front struts and loading forces on the rear portion due to rear struts.

In an exemplary embodiment, a roll cage chassis spine for an off-road vehicle comprises: a rear canopy for coupling to a rear portion of a chassis; and a front canopy for coupling to a front portion of the chassis and the rear canopy.

In another exemplary embodiment, front canopy and the rear canopy comprise an overhead assembly that extends over a passenger cabin portion of the chassis and contributes to the structural integrity of the chassis. In another exemplary embodiment, the front canopy and the rear canopy are configured to provide an overhead spine to the chassis that increases the strength of the chassis and improves the safety of occupants within the vehicle. In another exemplary embodiment, the front canopy and the rear canopy are configured to cooperatively reinforce the chassis during loading forces on the front portion due to front struts and loading forces on the rear portion due to rear struts.

In an exemplary embodiment, a chassis for an off-road vehicle comprises: a passenger cabin portion disposed between a front portion and a rear portion; and a canopy coupled to the front and rear portions and configured to contribute to the structural integrity of the chassis.

In another exemplary embodiment, the passenger cabin portion is configured to cooperate with the front portion and the rear portion to distribute loading forces during operation of the vehicle so as to resist damage to components comprising the vehicle and to protect occupants riding within the vehicle. In another exemplary embodiment, the canopy comprises a front canopy and a rear canopy that are configured to be respectively coupled with the front portion and the rear portion; and wherein the front canopy is configured to be coupled with the rear canopy. In another exemplary embodiment, front canopy and the rear canopy comprise an overhead assembly that contributes to the structural integrity of the chassis. In another exemplary embodiment, the front canopy and the rear canopy are configured to provide an overhead spine to the chassis that increases the strength of the chassis and improves the safety of occupants within the vehicle relative to conventional chassis configurations. In another exemplary embodiment, the front canopy includes A-pillars configured to be coupled with hinge pillars comprising the passenger cabin portion and extend upward to a windshield crossmember. In another exemplary embodiment, each of the A-pillars joins with a roof bar that extends rearward and is configured to be coupled to the rear canopy.

In another exemplary embodiment, the front canopy includes a center roof bar that is disposed substantially midway between the roof bars and extends from the windshield crossmember rearward to a roof crossmember comprising the rear canopy. In another exemplary embodiment, the front canopy includes windshield braces that extend forward of the center roof bar from the windshield crossmember to a dash bar comprising the passenger cabin portion. In another exemplary embodiment, the windshield braces are joined to locations of the dash bar that coincide with front strut braces comprising the front portion. In another exemplary embodiment, the rear canopy includes a roof crossmember that is disposed between B-pillars that are configured to be coupled with rear pillars comprising the passenger cabin portion. In another exemplary embodiment, the rear canopy includes a rear brace extending rearward of each B-pillar from the roof crossmember to a rear hoop comprising the rear portion. In another exemplary embodiment, the rear canopy includes roof braces extending rearward of a center roof bar comprising the front canopy from the roof crossmember to the rear braces.

In an exemplary embodiment, a method for a roll cage chassis spine for an off-road vehicle comprises: coupling a rear canopy to a rear portion of a chassis; coupling a front canopy to a front portion of the chassis; and coupling the front canopy to the rear canopy.

In another exemplary embodiment, the method further includes configuring the front canopy and the rear canopy to cooperatively reinforce the chassis during loading forces on the front portion due to front struts and loading forces on the rear portion due to rear struts. In another exemplary embodiment, the method further includes configuring the front canopy and the rear canopy to form an overhead assembly that extends over a passenger cabin portion of the chassis and contributes to the structural integrity of the chassis.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
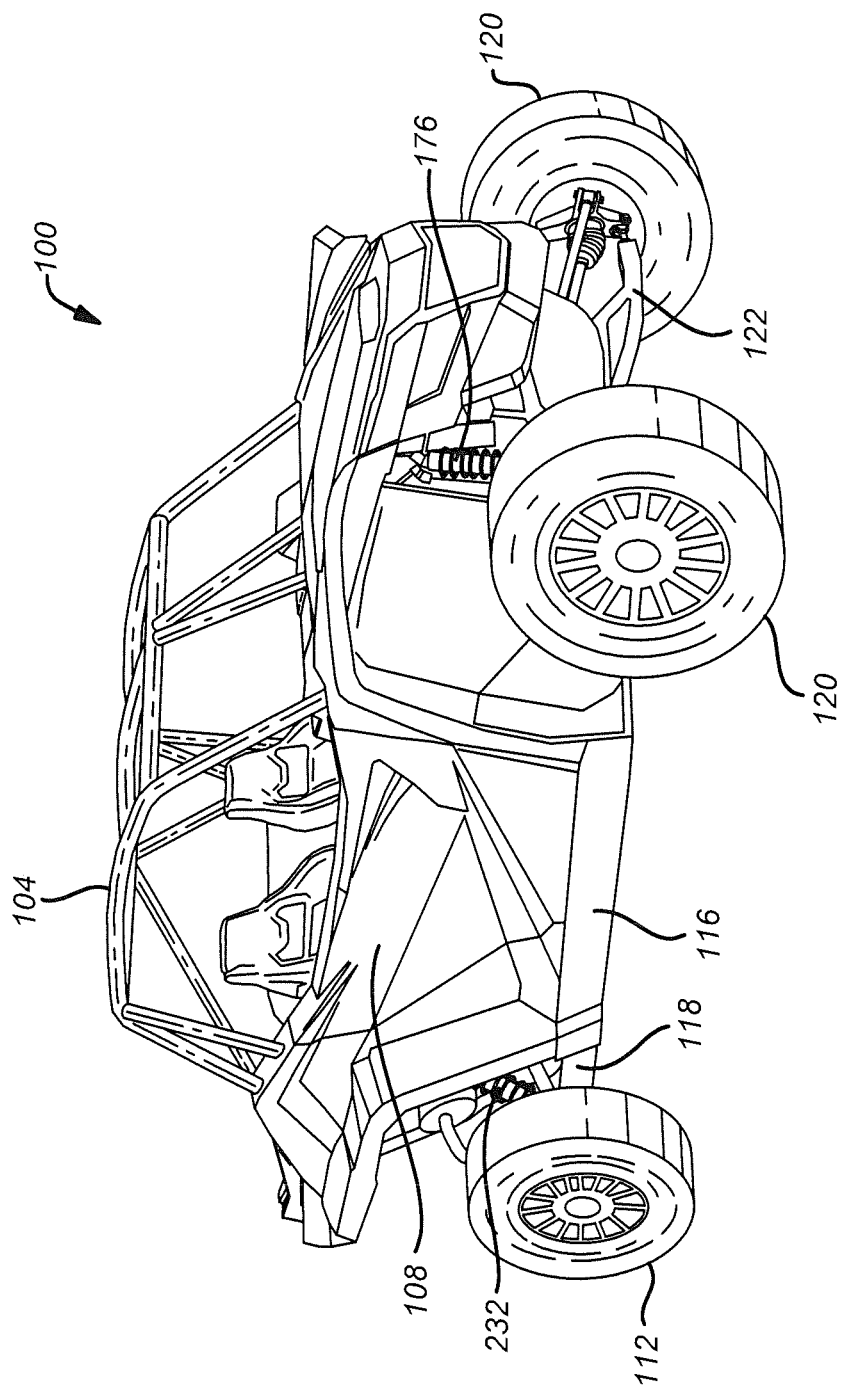
FIG. 1 illustrates an exemplary embodiment of an off-road vehicle that is suitable for implementation of a roll cage chassis spine in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first tube," may be made. However, the specific numeric reference should not be interpreted as a literal sequential order but rather interpreted that the "first tube" is different than a "second tube." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for an off-road vehicle chassis comprising a roll cage spine configured to improve the strength of the chassis.

FIG. 1 shows an off-road vehicle 100 that is particularly suitable for implementation of a roll cage chassis spine in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system 118. Front wheels 120 may be operably coupled with the chassis 116 by way of a front suspension system 122 and a spindle assembly. It should be understood, however, that the roll cage chassis spine disclosed herein is not to be limited to the specific off-road vehicle 100 shown in FIG. 1, but rather the roll cage chassis spine may be incorporated into a wide variety of vehicles, other than the off-road vehicle 100 of FIG. 1, without limitation.

Figure 2:
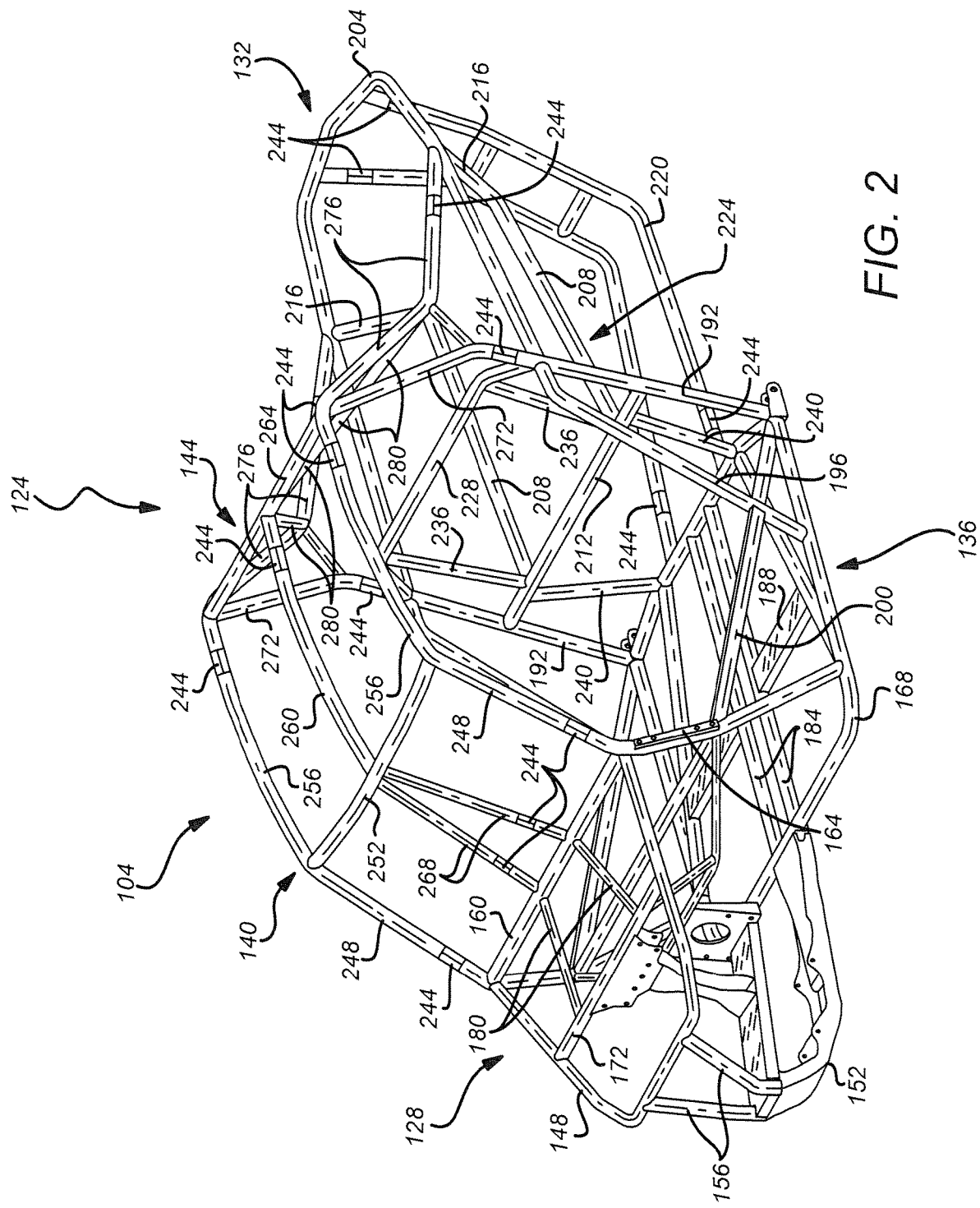
FIG. 2 illustrates an isometric view of an exemplary embodiment of vehicle chassis that includes a roll cage chassis spine according to the present disclosure.

FIG. 2 illustrates an isometric view of an exemplary embodiment of vehicle chassis that includes a roll cage chassis spine 124 (hereinafter "chassis 124") that is suitable for implementation in the off-road vehicle 100 of FIG. 1. The chassis 124 generally is a welded-tube variety of chassis that includes a front portion 128 and a rear portion 132 that are joined to an intervening passenger cabin portion 136. A front canopy 140 and a rear canopy 144 are configured to impart structural integrity to the chassis 124 and to provide overhead protection to occupants of the off-road vehicle 100, as described herein.

The front portion 128 generally is configured to support various components comprising the off-road vehicle 100, such as, by way of non-limiting example, a front suspension 122, a steering gear, a front differential, and the like. The front portion 128 may be defined by a front hoop 148 at a top of the front portion 128 and a front skid plate 152 at a bottom of the front portion 128. Frontward stays 156 attach the front hoop 148 to the front skid plate 152. As will be appreciated, the frontward stays 156 operate similarly to a front bulkhead of the chassis 124. Opposite of the frontward stays 156, the front hoop 148 is joined to opposite ends of a dash bar 160 and hinge pillars 164 comprising the passenger cabin portion 136. Further, a rear of the front skid plate 152 is fastened to a floor hoop 168 comprising the passenger cabin portion 136.

With continuing reference to FIG. 2, a front strut crossmember 172 is attached at opposite ends between the driver-side and passenger-side of the front hoop 148. The front strut crossmember 172 provides a means for coupling front struts 176 to the chassis 124, see for example FIG. 1. As shown in FIG. 2, front strut braces 180 are disposed between the front strut crossmember 172 and the dash bar 160. The front strut braces 180 are configured to reinforce the front strut crossmember 172, such that loading on the front strut crossmember 172 by the front struts 176 is distributed to the dash bar 160. As such, forces on the front strut crossmember 172 by the front struts 176, during operation of the vehicle 100, are shared by the dash bar 160.

With continuing reference to FIG. 2, the floor hoop 168 generally defines a floor of the passenger cabin portion 136. Longitudinal floor bars 184 and crossmembers 188 coupled with the floor hoop 168 impart structural strength to the passenger cabin portion 136 and facilitate coupling various components to the floor of the passenger cabin portion 136. The hinge pillars 164 join the front portion 128 with the floor hoop 168, and thus define a front of the passenger cabin portion 136. Rear pillars 192 are coupled with a rear of the passenger cabin portion 136 and join the passenger cabin portion 136 with the rear portion 132 of the chassis 124. A rear side brace 196 is disposed between each rear pillar 192 and the floor hoop 168. Similarly, a front side brace 200 is disposed between the floor hoop 168 and each hinge pillar 164. It is contemplated that the side braces 196, 200 generally comprise side X-bars that impart structural integrity to the chassis 124 and thus resist bowing of the passenger cabin portion 136 due to loading on the front and rear portions 128, 132 during operation of the vehicle 100.

The rear portion 132 generally is configured to support a rear suspension 118 of the off-road vehicle, such as rear trailing arms, as well as support various drivetrain components, shown in FIG. 1, such as a transaxle, a rear differential, an engine, and the like. A rear hoop 204 is joined at opposite ends to rear pillars 192 and defines an upper extent of the rear portion 132. Below the rear hoop 204 are lower rear stays 208 that are coupled with the rear pillars 192 by way of a seat crossmember 212. Braces 216 couple the lower rear stays 208 to the rear hoop 204. The rear hoop 204, the lower rear stays 208 and the braces 216 comprise a structure suitable for mounting drivetrain components, such as a transaxle, a rear differential, an engine, and the like. A rear skid plate 220 is disposed at a bottom of the rear portion 132 and coupled between the passenger cabin portion 136 and a rear-most portion of the rear hoop 132. The rear skid plate 220 serves to provide protection to an underside of the drivetrain components during operation of the vehicle 100. As such, the rear hoop 204, the lower rear stays 208 and the rear skid plate 220 generally define an engine bay 224 of the vehicle 100.

As shown in FIG. 2, a rear strut crossmember 228 is disposed between the rear pillars 192 and joined with the ends of the rear hoop 204. The rear strut crossmember 228 is configured to provide a means for coupling rear struts 232 to the chassis 124, as shown in FIG. 1. As shown in FIG. 2, vertical braces 236 are disposed between the rear strut crossmember 228 and the seat crossmember 212. The vertical braces 236 are configured to reinforce the rear strut crossmember 228, such that loading on the rear strut crossmember 228 by the rear struts 232 is distributed to the seat crossmember 212. As such, forces on the rear strut crossmember 228 by the rear struts 232, during operation of the vehicle 100, are shared by the seat crossmember 212. Further, lower braces 240 disposed between the seat crossmember 212 and the floor hoop 168 cause the passenger cabin portion 136 to contribute to distributing loading forces throughout the chassis 124.

As will be appreciated, the passenger cabin portion 136, as well as the front portion 128 and the rear portion 132, are configured to distribute loading forces during operation of the vehicle 100 so as to resist damage to components comprising the vehicle and to protect occupants riding within the vehicle 100. To this end, the canopy 104 is configured to contribute to the structural integrity of the chassis 124. The canopy 104 comprises a front canopy 140 and rear canopy 144 that are configured to be coupled with the chassis 124. In particular, the front canopy 140 is configured to be coupled with the front portion 128, and the rear canopy 144 is configured to be coupled with the rear portion 132.

Moreover, the front canopy 140 is configured to be coupled with the rear canopy 144. The front and rear canopies 140, 144 are respectively fastened to the front and rear portions 128, 132 by way of multiple fasteners 244. In general, each fastener 244 comprises a tube-shaped member having a diameter that is substantially similar to the diameter of the frame portions to be coupled together.

It should be recognized that the front canopy 140 and the rear canopy 144 provide an overhead assembly that contributes to the overall integrity of the entire chassis 124. As such, the front canopy 140 and the rear canopy 144 provide an overhead spine to the chassis 124 that greatly increases the strength of the chassis 124 and thus the safety of occupants of the vehicle 100 relative to conventional chassis configurations. The front and rear canopies 140, 144 are discussed in greater detail in the following paragraphs.

The front canopy 140 includes an A-pillar 248 that is coupled with each hinge pillar 164 by way of a suitably sized fastener 244. The A-pillars 248 extend upward to a windshield crossmember 252. As such, the A-pillars 248 and the windshield crossmember 252 generally define a windshield area of the vehicle 100. Each A-pillar 248 joins with a roof bar 256 that extends rearward to the rear canopy 144. In some embodiments, the A-pillar 248 and the roof bar 256 comprise separate tube-pieces that are fastened or joined together, such as by welding. In some embodiments, however, the A-pillar 248 and the roof bar 256 comprise a single tube-piece that is suitably bent or manipulated to form the A-pillar 248 and the roof bar 256 as shown in FIG. 2. The roof bars 256 are each fastened to the rear canopy 144 by way of a suitably sized fastener 244.

With continuing reference to the front canopy 140 of FIG. 2, a center roof bar 260 is disposed substantially midway between the roof bars 256 and extends from the windshield crossmember 252 rearward to a roof crossmember 264 that comprises the rear canopy 144. Forward of the center roof bar 260, windshield braces 268 extend toward the dash bar 160. Each windshield brace 268 is joined with the dash bar 160 by way of a suitably sized fastener 244. Further, the windshield braces 268 are joined to locations of the dash bar 160 that coincide with the front strut braces 180. It is contemplated that loading forces due to the front struts 176, shown in FIG. 1, are distributed along the front strut braces 180, the windshield braces 268, and the center roof bar 260 to the rear canopy 144. It should be understood, therefore, that the front strut braces 180, the windshield braces 268, the center roof bar 260 and the rear canopy 144 comprise an overhead spine that serves to reinforce the structural integrity of the chassis 124.

As shown in FIG. 2, the center roof bar 260 and both roof bars 256 are each fastened to the roof crossmember 264 by way of suitably sized fasteners 244. The roof crossmember 264 is disposed between B-pillars 272 that are fastened to the rear pillars 192 comprising the passenger cabin portion 136 by way of fasteners 244. A rear brace 276 extends rearward of each B-pillar 272 from the roof crossmember 264 to the rear hoop 204. A suitably sized fastener 244 couples each rear brace 276 to the rear hoop 204. As such, the roof bars 256 are reinforced by the passenger cabin portion 136 by way of the rear pillars 192 and the B-pillars 272, as well as the rear portion 132 by way of the rear braces 276. Further, the center roof bar 260 is reinforced by roof braces 280 extending from the roof crossmember 264 to the rear braces 276. To this end, the roof braces 280 are joined with the roof crossmember 264 at a location directly rearward of the center roof bar 260. Thus, forces acting on the center roof bar 260 are distributed to the rear braces 276 by way of the roof crossmember 264 and the roof braces 280.

Figure 3:
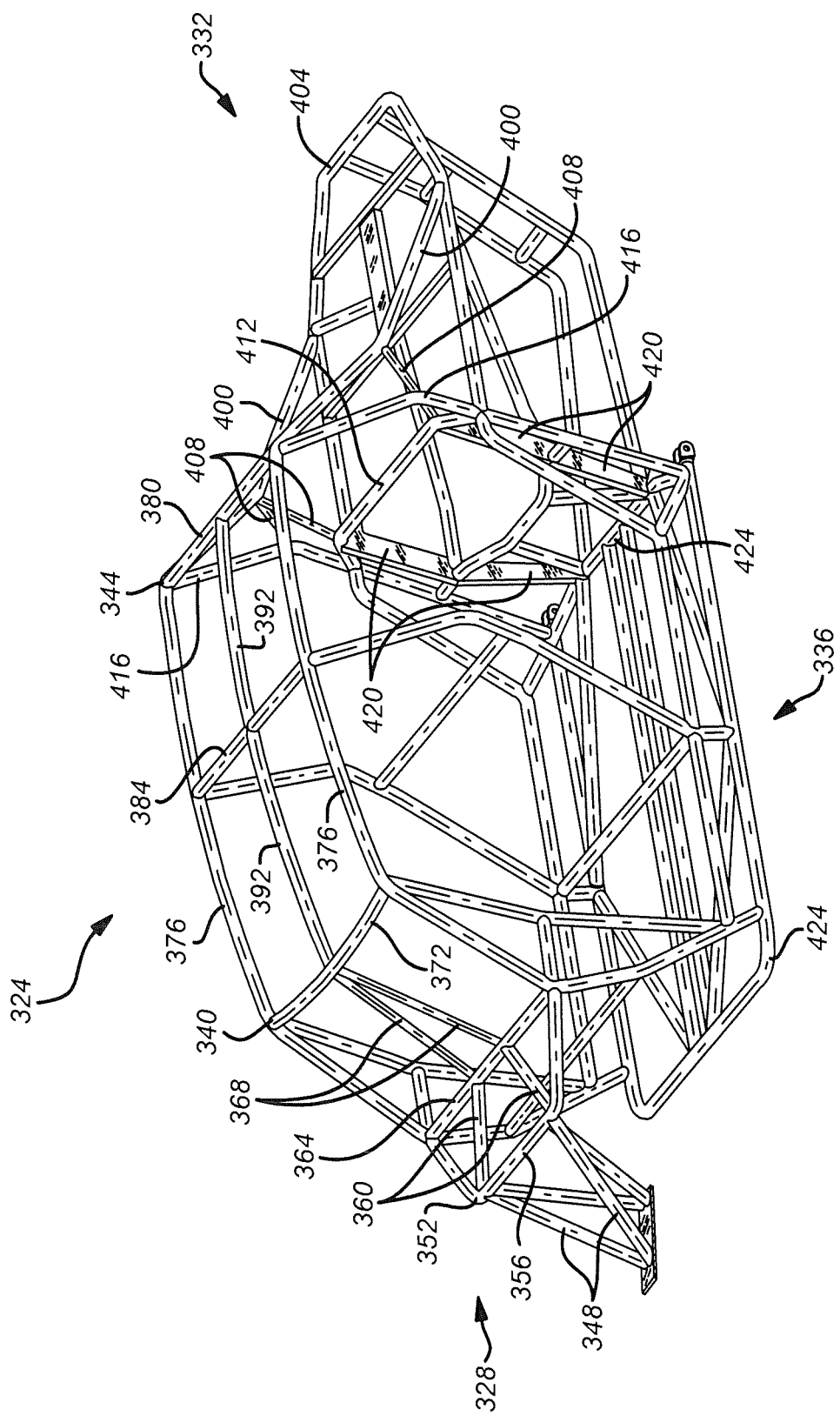
FIG. 3 illustrates an isometric view of an exemplary embodiment of vehicle chassis that includes a roll cage chassis spine that is suitable for implementation in an off-road vehicle configured to seat up to four occupants.

FIG. 3 illustrates an exemplary embodiment of vehicle chassis 324 that includes a roll cage chassis spine that is suitable for implementation in an off-road vehicle as described herein. The chassis 324 shown in FIG. 3 is similar to the chassis 124 shown in FIG. 2, with the exception that the chassis 324 is adapted for use in an off-road vehicle configured to carry four occupants. The chassis 324 generally is a welded-tube variety of chassis that includes a front portion 328 and a rear portion 332 that are joined to an intervening passenger cabin portion 336. A front canopy 340 and a rear canopy 344 are configured to impart structural integrity to the chassis 324 and to provide overhead protection to occupants within the passenger cabin portion 336.

As will be appreciated, the roll cage chassis spine comprises welded-tube members that are arranged within the chassis 324 to enhance the structural integrity of the passenger cabin portion 336 by reinforcing the front canopy 340 and the rear canopy 344 between the front portion 328 and the rear portion 332. To this end, the roll cage chassis spine includes frontward stays 348 that are configured to be attached between a front hoop 352 of the chassis 324 and a front bulkhead (not shown) that supports the front suspension 122 of the off-road vehicle. The frontward stays 348 may be attached to a front strut crossmember 356 that provides a means for coupling front struts 176 to the chassis 324. Thus, forces on the front suspension 122 are conveyed to the front portion 328 by the way of the frontward stays 348 and the front struts 176.

Figure 4:
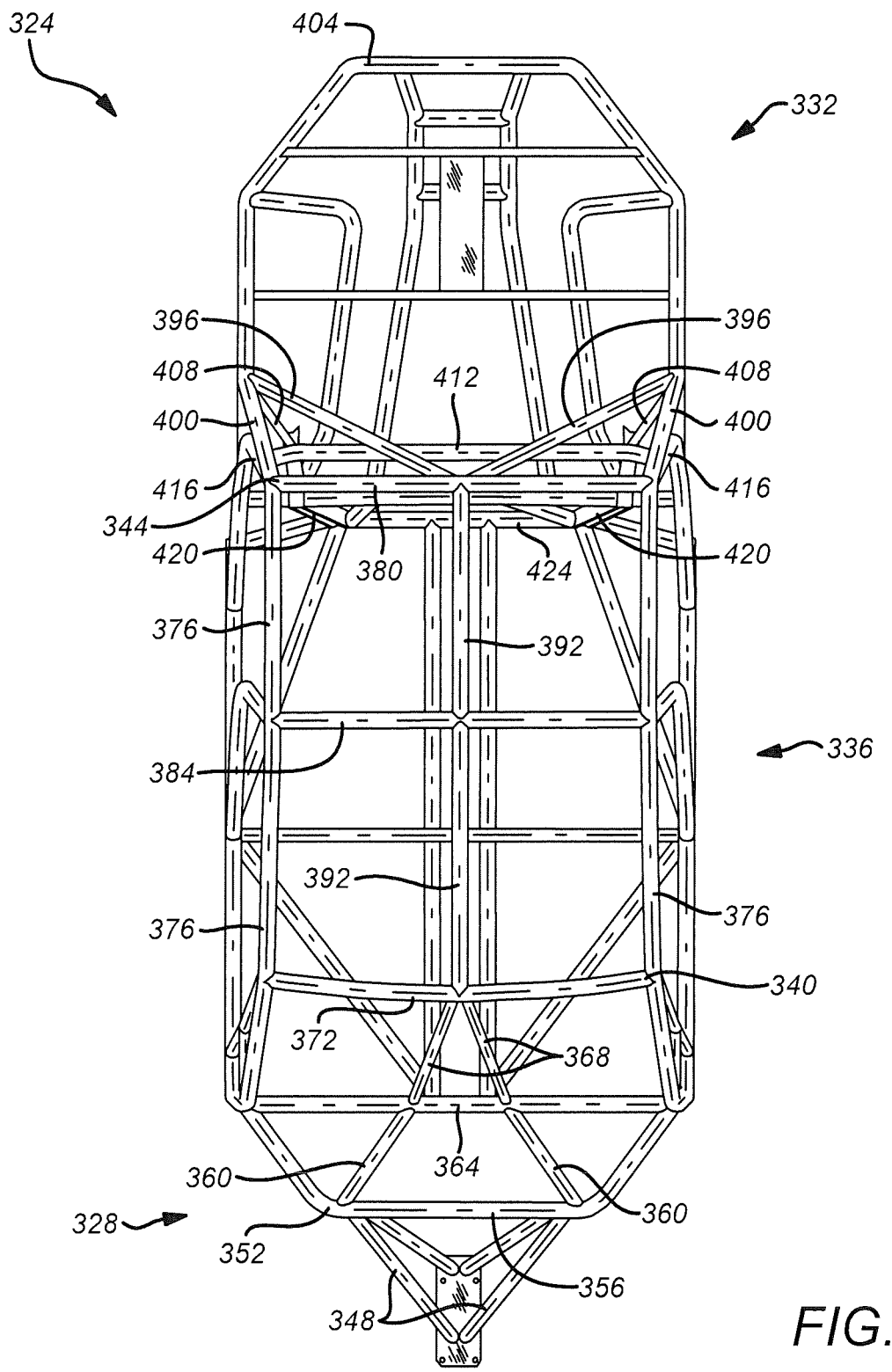
FIG. 4 illustrates a top plan view of the vehicle chassis of FIG. 3, in accordance with the present disclosure.

As shown in FIGS. 3 and 4, front strut braces 360 are disposed between the front strut crossmember 356 and a dash bar 364 comprising the passenger cabin portion 336 of the chassis 324. The front strut braces 360 are configured to reinforce the front strut crossmember 356, such that loading on the front strut crossmember 356 by the front struts 176 is distributed to the dash bar 364. As such, forces on the front strut crossmember 356 by the front struts 176, during operation of the off-road vehicle, are shared by the dash bar 364.

As best shown in FIG. 4, windshield braces 368 are joined to locations of the dash bar 364 that coincide with the front strut braces 360 and extend upward to a central location of a windshield crossmember 372. As described hereinabove, opposite ends of the windshield crossmember 372 are joined to roof bars 376 that extend from the windshield crossmember 372 rearward to a roof crossmember 380 that comprises the rear canopy 344. In the four-occupant embodiment shown in FIG. 4, a central roof crossmember 384 is disposed midway along the roof bars 376 to provide further structure between the front canopy 340 and the rear canopy 344.

Directly rearward of the windshield braces 368, a center roof bar 392 extends from the windshield crossmember 372 rearward to the center roof crossmember 384. The center roof bar 392 continues rearward from the center roof crossmember 384 to the roof crossmember 380. As shown in FIG. 4, roof braces 396 are joined to the roof crossmember 380 directly rearward of the center roof bar 392. Each roof brace 396 extends to a rear brace 400. As best shown in FIG. 3, each rear brace 400 extends rearward from the roof crossmember 380 to a rear hoop 404 comprising the rear portion 332. Thus, forces acting on the center roof bar 392 are distributed to the rear braces 400 by way of the roof crossmember 380 and the roof braces 396.

Moreover, angled braces 408 extend from each rear brace 400 to a rear strut crossmember 412 and a C-pillar 416 comprising the rear portion 332 of the chassis 324. Rear gussets 420 are disposed between a floor hoop 424 and the rear strut crossmember 412. The rear gussets 420 provides a means for coupling rear struts 232 (see FIG. 1) and the trailing arm suspension 118 to the chassis 324.

As will be recognized, loading forces due to the rear struts 232 (see FIG. 1) are distributed through the rear gussets 420 to the angled braces 408, the roof braces 396, and the center roof bar 392. Further, loading forces due to the front struts 176 are distributed along the front strut braces 360, the windshield braces 368, and the center roof bar 392. It should be understood, therefore, that the front strut braces 360, the windshield braces 368, the center roof bar 392, the roof braces 396, and the angled braces 408 comprise a roll cage chassis spine that serves to reinforce the structural integrity of the chassis 324.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A roll cage chassis spine for an off-road vehicle, the chassis spine comprising:

a rear canopy for coupling to a rear portion of a chassis;
a front canopy for coupling to a front portion of the chassis and the rear canopy; and wherein:

the front canopy and the rear canopy comprise an overhead assembly that extends over a passenger cabin portion of the chassis and contributes to the structural integrity of the chassis;

the front canopy and the rear canopy are configured to provide an overhead spine to the chassis that increases the strength of the chassis and improves the safety of occupants within the vehicle;

the overhead spine comprises two roof bars and a center roof bar coupled to the front canopy and the rear canopy; and there is a central roof crossmember coupled to the two sidebars and the center roof bar, wherein the chassis spine comprises:
  a front hoop that extends forward from a dash bar, the front hoop has a proximal end and a distal end;
  a platform spatially positioned below and forward to the front hoop, the platform is of an elongated rectangular profile having a front end portion and a rear end portion;
  a front forward stay of a V-shape profile, the front forward stay extends between the proximal end of the front hoop, the distal end of the front hoop, and the front end portion of the platform; and
  a rear forward stay of a V-shape profile, the rear forward stay extends between the proximal end of the front hoop, the distal end of the front hoop, and the rear end portion of the platform,
  wherein the front end portion and the rear end portion of the platform are along an x-axis, the proximal end and the distal end of the front hoop are along a y-axis, the x-axis is perpendicular to the y-axis.

2. The chassis spine of claim 1, wherein the front canopy and the rear canopy are configured to cooperatively reinforce the chassis during loading forces on the front portion due to front struts and loading forces on the rear portion due to rear struts.

3. A chassis for an off-road vehicle, the chassis comprising:
  a passenger cabin portion disposed between a front portion and a rear portion;
  a canopy coupled to the front and rear portions and configured to contribute to the structural integrity of the chassis; and wherein:
  the canopy comprises two roof bars and a center roof bar coupled to the front portion and the rear portion; and
  there is a central roof crossmember coupled to the two sidebars and the center roof bar, wherein the chassis comprises:
    a front hoop that extends forward from a dash bar, the front hoop has a proximal end and a distal end;
    a platform spatially positioned below and forward to the front hoop, the platform is of an elongated rectangular profile having a front end portion and a rear end portion;
    a front forward stay of a V-shape profile, the front forward stay extends between the proximal end of the front hoop, the distal end of the front hoop, and the front end portion of the platform; and
    a rear forward stay of a V-shape profile, the rear forward stay extends between the proximal end of the front hoop, the distal end of the front hoop, and the rear end portion of the platform,
    wherein the front end portion and the rear end portion of the platform are along an x-axis, the proximal end and the distal end of the front hoop are along a y-axis, the x-axis is perpendicular to the y-axis.

4. The chassis of claim 3, wherein the passenger cabin portion is configured to cooperate with the front portion and the rear portion to distribute loading forces during operation of the vehicle so as to resist damage and to protect occupants riding within the vehicle.

5. The chassis of claim 3, wherein the canopy comprises a front canopy and a rear canopy that are configured to be respectively coupled with the front portion and the rear portion; and wherein the front canopy is configured to be coupled with the rear canopy.

6. The chassis of claim 5, wherein front canopy and the rear canopy comprise an overhead assembly that contributes to the structural integrity of the chassis.

7. The chassis of claim 5, wherein the front canopy and the rear canopy are configured to provide an overhead spine to the chassis that increases the strength of the chassis and improves the safety of occupants within the vehicle relative to conventional chassis configurations.

8. The chassis of claim 5, wherein the front canopy includes A-pillars configured to be coupled with hinge pillars comprising the passenger cabin portion and extend upward to a windshield crossmember.

9. The chassis of claim 8, wherein each of the A-pillars joins with a respective roof bar of the two roof bars that extends rearward and is configured to be coupled to the rear canopy.

10. The chassis of claim 9, wherein the center roof bar that is disposed substantially midway between the two roof bars and extends from the windshield crossmember rearward to a roof crossmember comprising the rear canopy.

11. The chassis of claim 10, wherein the front canopy includes windshield braces that extend forward of the center roof bar from the windshield crossmember to the dash bar comprising the passenger cabin portion.

12. The chassis of claim 11, wherein the windshield braces are joined to locations of the dash bar that coincide with front strut braces comprising the front portion.

13. The chassis of claim 8, wherein the rear canopy includes a roof crossmember that is disposed between B-pillars that are configured to be coupled with rear pillars comprising the passenger cabin portion.

14. The chassis of claim 13, wherein the rear canopy includes a rear brace extending rearward of each B-pillar from the roof crossmember to a rear hoop comprising the rear portion.

15. The chassis of claim 14, wherein the rear canopy includes roof braces extending rearward of a center roof bar comprising the front canopy from the roof crossmember to the rear braces.

16. A method for a roll cage chassis spine for an off-road vehicle, the method comprising:
  coupling a rear canopy to a rear portion of a chassis;
  coupling a front canopy to a front portion of the chassis;
  coupling the front canopy to the rear canopy with two roof bars and a central roof bar; and
  wherein there is a central roof crossmember coupled to the two roof bars and the center roof bar between the front canopy and the rear canopy,
  there is a central roof crossmember coupled to the two sidebars and the center roof bar, wherein the chassis is configured by providing:
    a front hoop that extends forward from a dash bar, the front hoop has a proximal end and a distal end;
    a platform spatially positioned below and forward to the front hoop, the platform is of an elongated rectangular profile having a front end portion and a rear end portion;
    a front forward stay of a V-shape profile, the front forward stay extends between the proximal end of the front hoop, the distal end of the front hoop, and the front end portion of the platform; and
    a rear forward stay of a V-shape profile, the rear forward stay extends between the proximal end of the front hoop, the distal end of the front hoop, and the rear end portion of the platform,
    wherein the front end portion and the rear end portion of the platform are along an x-axis, the proximal end and the distal end of the front hoop are along a y-axis, the x-axis is perpendicular to the y-axis.

17. The method of claim 16, further including configuring the front canopy and the rear canopy to cooperatively reinforce the chassis during loading forces on the front portion due to front struts and loading forces on the rear portion due to rear struts.

18. The method of claim 16, further including configuring the front canopy and the rear canopy to form an overhead assembly that extends over a passenger cabin portion of the chassis and contributes to the structural integrity of the chassis.

\* \* \* \* \*